(12) United States Patent
Tomasiak

(10) Patent No.: US 7,789,952 B2
(45) Date of Patent: Sep. 7, 2010

(54) VACUUM APPLIANCE FILTER CONDITION INDICATOR

(75) Inventor: Mark Tomasiak, O'Fallon, MO (US)

(73) Assignee: Emerson Electric Co., St. Louis, MO (US)

( * ) Notice: Subject to any disclaimer, the term of this patent is extended or adjusted under 35 U.S.C. 154(b) by 1031 days.

(21) Appl. No.: 11/382,426

(22) Filed: May 9, 2006

(65) Prior Publication Data

US 2007/0017373 A1 Jan. 25, 2007

Related U.S. Application Data

(60) Provisional application No. 60/594,810, filed on May 9, 2005.

(51) Int. Cl.
*B01D 46/00* (2006.01)
(52) U.S. Cl. .......... 96/421; 15/319; 73/31.04; 55/DIG. 34
(58) Field of Classification Search ........... 96/421; 15/319; 73/31.04; 55/DIG. 34
See application file for complete search history.

(56) References Cited

U.S. PATENT DOCUMENTS

| | | | | |
|---|---|---|---|---|
| 2,022,250 A | * | 11/1935 | Lofgren | 96/419 |
| 3,066,527 A | * | 12/1962 | Stein | 73/114.31 |
| 3,712,114 A | * | 1/1973 | Osborn | 73/38 |
| 3,934,543 A | | 1/1976 | Howard | |
| 4,060,050 A | | 11/1977 | Simonsson | |
| 4,162,660 A | | 7/1979 | Albertson et al. | |
| 4,330,900 A | * | 5/1982 | Dorr et al. | 15/339 |
| 4,747,364 A | | 5/1988 | Horowitz | |
| 5,057,821 A | | 10/1991 | Card | |
| 5,616,157 A | | 4/1997 | Mead et al. | |
| 5,882,379 A | | 3/1999 | Johnson | |
| 6,026,539 A | | 2/2000 | Mouw et al. | |
| 6,320,513 B1 | | 11/2001 | Timmons, Jr. | |

\* cited by examiner

*Primary Examiner*—Robert J Hill, Jr.
*Assistant Examiner*—Christopher P Jones
(74) *Attorney, Agent, or Firm*—Locke Lord Bissell & Liddell LLP

(57) ABSTRACT

A filter condition indicator for a vacuum appliance having a filter includes a housing with a diaphragm dividing the housing into first and second chambers. One chamber receives a pressure indication from inside the filter, and the other chamber receives a pressure indication from outside the filter. An indicator device is activated by movement of the diaphragm in response to a pressure differential between the first and second chambers.

8 Claims, 3 Drawing Sheets

VACUUM APPLIANCE FILTER CONDITION INDICATOR

CROSS-REFERENCE TO RELATED APPLICATION

This application is a non-provisional application of U.S. Provisional Application No. 60/594,810, filed on May 9, 2005, which is incorporated by reference.

BACKGROUND

The present invention relates generally to vacuum appliances.

Vacuum appliances are well known. For example, vacuum appliances that are capable of picking up both wet and dry material, commonly referred to as wet/dry vacuums or wet/dry vacs, are often used in workshops and other environments where both wet and dry debris can accumulate. Wet/dry vacuums conventionally consist of a collection canister or drum, usually mounted on a dolly having wheels or casters, and a powerhead within which a motor and impeller assembly is mounted. The motor and impeller assembly creates a suction within the drum, such that debris and/or liquid are drawn into the drum through an air inlet to which a flexible hose can be attached. A filter within the drum prevents incoming debris from escaping from the drum while allowing filtered air to escape. As debris collects on the filter, the performance of the vacuum decreases. As the filter becomes dirtier, the performance of the vacuum decreases until a point that is noticeable by the operator. It is normally at this time that the operator will clean or replace the filter.

In an effort to provide an indication to a user that the filter is clogged, some vacuum systems provide an indicator showing how clean the filter is. Some known indicators read the pressure inside the filter to make a reading as to how clean the filter is. Unfortunately, this is not a truly accurate way to determine how clean the filter is. Many factors could cause an inaccurate or false reading using this method including, a clogged hose, an accessory with a small opening, using an accessory on carpet, picking up water, etc.

The present application addresses shortcomings associated with the prior art.

SUMMARY

In accordance with certain teachings of the present disclosure, a filter condition indicator for a vacuum appliance having a filter includes a housing with a diaphragm dividing the housing into first and second chambers. One chamber receives a pressure indication from inside the filter, and the other chamber receives a pressure indication from outside the filter. An indicator device is activated by movement of the diaphragm in response to a pressure differential between the first and second chambers.

BRIEF DESCRIPTION OF THE DRAWINGS

Other objects and advantages of the invention will become apparent upon reading the following detailed description and upon reference to the drawings in which.

Figure 1:
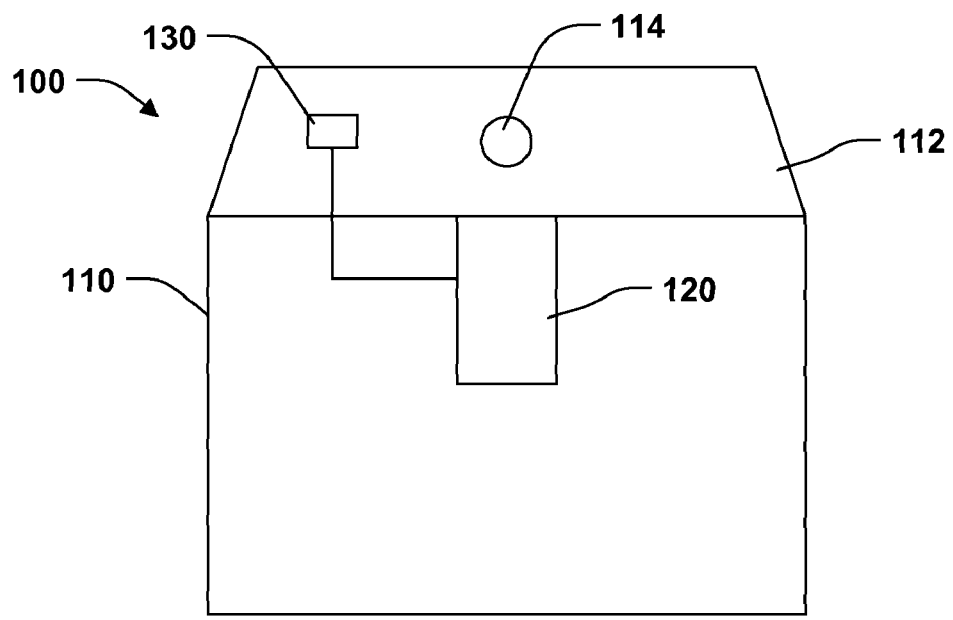
FIG. 1 is a block diagram conceptually illustrating portions of a vacuum appliance in accordance with certain teachings of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a block diagram conceptually illustrating portions of a vacuum appliance 100 in accordance with certain teachings of the present disclosure. The vacuum 100 includes a collection canister or drum 110 and a powerhead 112 within which a motor and impeller assembly is mounted. The powerhead 112 creates a suction within the drum 110, such that debris and/or liquid are drawn into the drum 110 through an air inlet 114 to which a flexible hose can be attached. A filter 120 within the drum prevents incoming debris from escaping from the drum 110 while allowing filtered air to escape through an air exhaust port (not shown). A filter condition indicator assembly 130 provides an indication to a user of the condition of the filter 120.

In accordance with certain teachings of the present disclosure, the filter condition indicator assembly 130 uses the differential pressure across the filter 120 as a way to determine the relative cleanliness of the filter 120. As the filter 120 becomes increasingly dirty, the differential pressure increases to the maximum performance power of the vacuum 100. Mechanical and electronic methods are available for measuring differential pressure across the filter 120. With an electrical method, pressure transducers are one way to determine the differential pressure across the filter 120. Mechanical devices include a spring with a moveable piston, or a weighted plunger.

Mechanical devices measure pressure inside the drum 110. Debris inside the drum 110 can become an issue with the filter condition indicator device 130, requiring either filtering the air going to the pressure tap inside the drum 110, or measuring the pressure in a manner that is not affected by small amounts of debris. If the air is not filtered between the pressure taps, the device will become dirty with time, and possibly fail.

Figure 2:
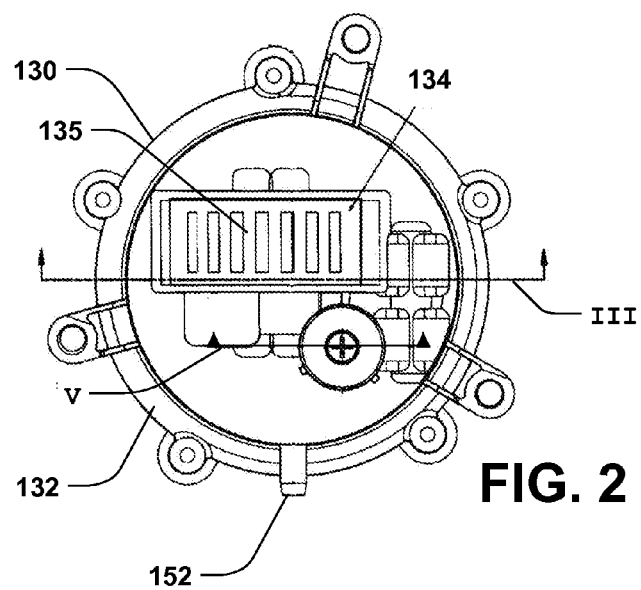
FIG. 2 is a top view of an exemplary filter condition indicator assembly in accordance with teachings disclosed herein.
Figure 3:
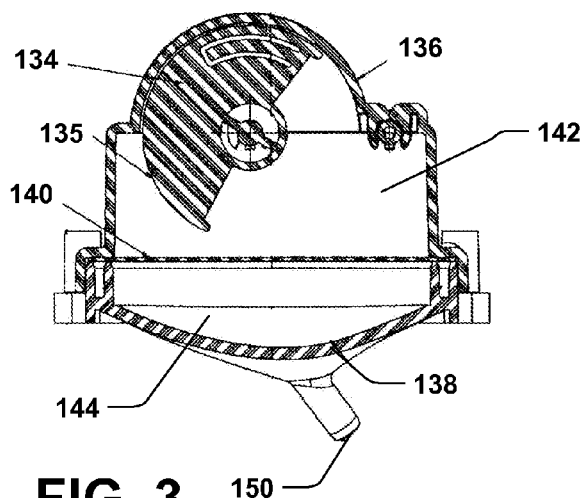
FIG. 3 is a sectional view of the exemplary filter condition indicator.

FIG. 2 is a top view of an exemplary embodiment of the filter condition indicator assembly 130. A housing 132 would typically be received in the powerhead assembly 110 with an indicator mechanism 134 having a display 135 exposed to show the filter condition to a user. FIG. 3 is a section view of the filter condition indicator assembly 130 taken along line III shown in FIG. 2. The housing 132 includes upper and lower members 136, 138, with a diaphragm 140 held between them. The diaphragm 140 separates two air chambers 142, 144. The clean side 142 of the pressure tap is on one side of the diaphragm 140. This side is best used for the display of the cleanliness of the filter, as it will not get dirty with use. The other side 144 is used as the barrier for the debris. This side is routed back to the drum 110 where the debris may return. The movement of the diaphragm 140 operates the indicator mechanism 134, which shows the operator filters condition.

The illustrated exemplary indicator mechanism 134 uses a movable rack and pinion arrangement. It allows for repeatable movement, simple assembly, and ease of manufacturing. In one implementation, a 30 inch pressure differential provides the desired performance level at which a filter change is indicated. Setting too low a value would have the operator constantly cleaning the filter, and setting to high a value would allow the performance of the unit to be to poor. At a 30 inch pressure differential, the performance of the unit will have degraded to less than half of its original value at this point, and can be easily noticed by the operator. Also at this point, the filter 120 has faceloaded enough that the operator can see that the filter 120 needs to be cleaned or replaced.

Figure 4:
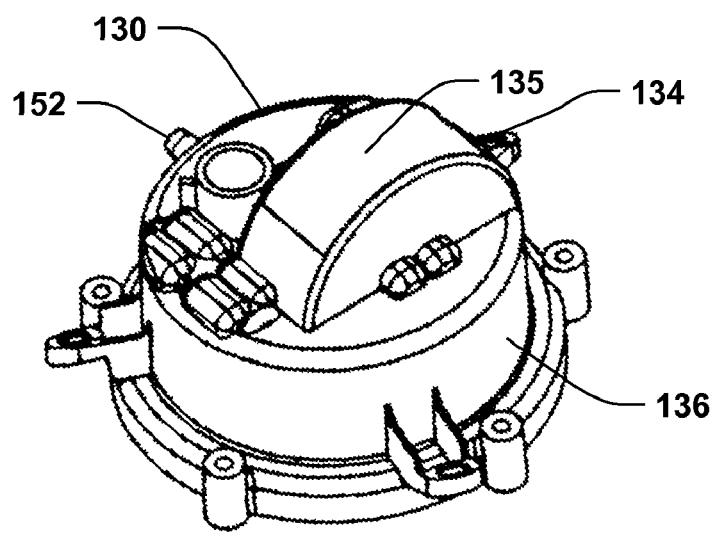
FIG. 4 is a perspective view of a portion of the filter condition indicator shown in FIGS. 2 and 3.
Figure 5:
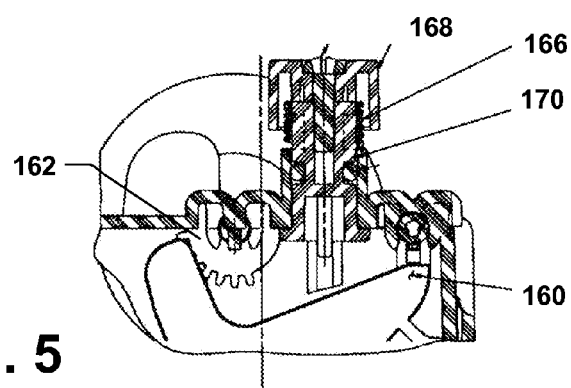
FIG. 5 is a sectional view illustrating certain details of the filter condition indicator shown in FIGS. 2-4.

The lower housing 138 is attached to a pressure port 150 reading the pressure inside the drum 110 (outside the filter 120). FIG. 4 is a perspective view of the upper housing 136, which reads pressure inside the filter via a port 152. As the pressure inside the filter 120 decreases, the diaphragm 140 displaces into the upper housing 136. This displacement pushes on the rack. FIG. 5 is a section view taken along line V shown in FIG. 2. The rack 160 rotates due to this displacement of the diaphragm 140, and it in turn rotates the display pinion 162. The display pinion 162 has the display 135 on a face thereof with graphics on it that represent the relative cleanliness of the filter 120. As the display pinion 162 rotates, the graphics on the display 135 will change the display from indicating a clean filter to indicating a dirty filter. For example, the portion of the display 135 indicating clean may be colored green, with the dirty indicator being colored red. As the display pinion 162 rotates from clean, a portion of the green indicator and a portion of the red indicator show, until the indicator is completely red signaling a dirty filter at maximum travel of the display pinion 162.

The display pinion 162 includes a bias spring 166 that maintains its position in the housing 136. This "Peak Hold" feature maintains the position of the indicator device 134 whether the vacuum 100 is on or off. A reset button 168 is used to reset the device 134 back to the position where the display pinion 162 shows a fully clean filter (fully green). The reset button 168 pushes a shaft 170 against the rack 160. If the filter 120 has been cleaned, the unit operates as described above. If the reset button 168 is pushed without the filter 120 being cleaned, the device will return to its previous position as soon as the unit is turned on due to movement of the diaphragm 140.

Figure 6:
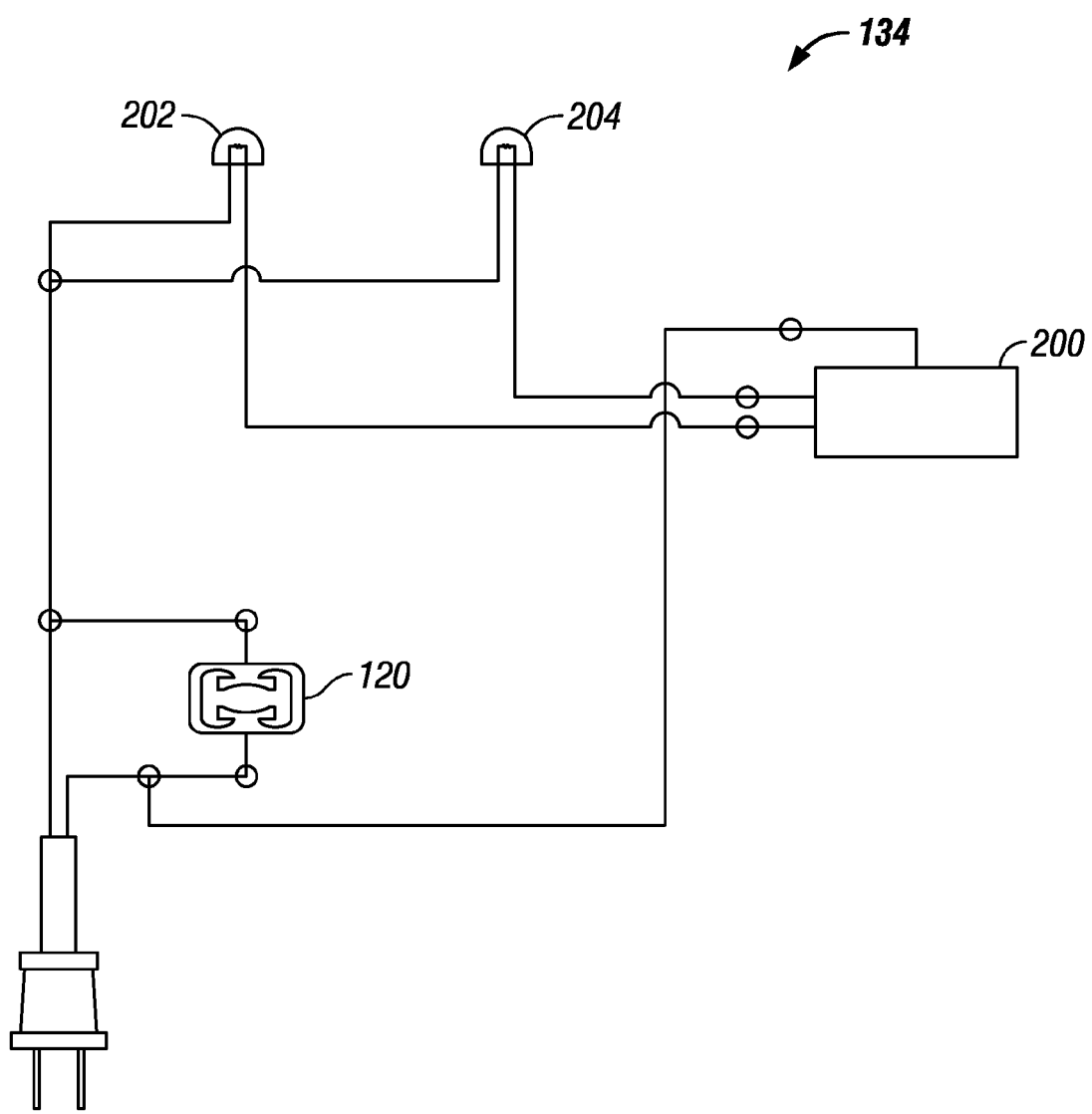
FIG. 6 is a circuit diagram illustrating an electronic filter condition indicator arrangement.

An alternative embodiment uses an electronic device that uses differential pressure to operate a micro switch. This switch may be used to control other functions (turn lights off on, turn motor off on, activate a filter cleaner). A suitable switch is a PS200 Series pressure switch from Goldtech Smart Controls (www.goldtech-controls.com) FIG. 6 shows a circuit diagram for implementing such a system. A micro switch 200 receives indications of pressure inside and outside the filter 120, and activates a green light 202 that is part of the filter condition indicator mechanism 134 when the filter 120 is clean, and activates a red light 204 when the filter 120 becomes dirty based on a predetermined pressure differential across the filter 120.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A filter condition indicator for a vacuum appliance having a filter, the filter condition indicator comprising: a housing; a diaphragm dividing the housing into first and second chambers, the first chamber receiving a pressure indication from inside the filter, the second chamber receiving a pressure indication from outside the filter; and an indicator device activated by movement of the diaphragm in response to a pressure differential between the first and second chambers; a rack and display pinion arrangement that moves in response to movement of the diaphragm; and a spring that biases the indicator device so as to maintain the position of the indicator device when the appliance is off.

2. The filter condition of claim 1, wherein the indicator device is situated in the first chamber.

3. The filter condition indicator of claim 1, further comprising a reset device.

4. The filter condition indicator of claim 3, wherein the reset device includes a shaft that interacts with the indicator device in response to actuation by a user to return the indicator device to an initial position.

5. A wet-dry vacuum appliance comprising: a collection drum; a powerhead operably connected to the drum to selectively create a suction within the drum; a filter connected to the powerhead and situated in the drum, the filter comprising: a housing; a diaphragm dividing the housing into first and second chambers, the first chamber receiving a pressure indication from inside the filter, the second chamber receiving a pressure indication form outside the filter; and an indicator device activated by movement of the diaphragm in response to a pressure differential between the first and second chambers; a rack and display pinion arrangement that moves in response to movement of the diaphragm; and a spring that biases the indicator device so as to maintain the position of the indicator device when the appliance is off.

6. The vacuum appliance of claim 5, wherein the indicator device is situated in the first chamber.

7. The vacuum appliance of claim 5, further comprising a reset device.

8. The vacuum appliance of claim 7, wherein the reset device includes a shaft that interacts with the indicator device in response to actuation by a user to return the indicator device to an initial position.

* * * * *

UNITED STATES PATENT AND TRADEMARK OFFICE
CERTIFICATE OF CORRECTION

PATENT NO. : 7,789,952 B2  Page 1 of 1
APPLICATION NO. : 11/382426
DATED : September 7, 2010
INVENTOR(S) : Mark Tomasiak It is certified that error appears in the above-identified patent and that said Letters Patent is hereby corrected as shown below:

At Column 4, Line 48, please correct the word as seen below:

"form" should be changed to --from--

Signed and Sealed this

Ninth Day of November, 2010

David J. Kappos
*Director of the United States Patent and Trademark Office*